US007275895B2

(12) United States Patent
Heinloth

(10) Patent No.: US 7,275,895 B2
(45) Date of Patent: Oct. 2, 2007

(54) CUTTING INSERT

(75) Inventor: Markus Heinloth, Postbauer-Heng (DE)

(73) Assignee: Kennametal Widia Produktions GmbH & Co. KG, Essen (DE)

( * ) Notice: Subject to any disclaimer, the term of this patent is extended or adjusted under 35 U.S.C. 154(b) by 0 days.

(21) Appl. No.: 10/563,856

(22) PCT Filed: Jul. 2, 2004

(86) PCT No.: PCT/DE2004/001406

§ 371 (c)(1),
(2), (4) Date: Jan. 4, 2006

(87) PCT Pub. No.: WO2005/005084

PCT Pub. Date: Jan. 20, 2005

(65) Prior Publication Data

US 2006/0165501 A1 Jul. 27, 2006

(30) Foreign Application Priority Data

| Jul. 9, 2003 | (DE) | ............................. 103 31 148 |
| Jul. 24, 2003 | (DE) | ............................. 103 33 621 |
| Mar. 23, 2004 | (DE) | ......................... 20 2004 004 654 U |

(51) Int. Cl.
*B23P 15/28* (2006.01)

(52) U.S. Cl. .................. 407/113; 407/114; 407/115
(58) Field of Classification Search ............... 407/113, 407/116, 114, 115
See application file for complete search history.

(56) References Cited

U.S. PATENT DOCUMENTS

| 4,963,061 | A | * | 10/1990 | Katbi et al. ................. 407/114 |
| 5,454,671 | A | * | 10/1995 | Qvarth ........................ 407/42 |
| 5,893,401 | A | * | 4/1999 | Eriksson .................. 144/208.8 |
| 6,632,051 | B1 | * | 10/2003 | Wermeister ................. 407/114 |
| 6,733,215 | B2 | * | 5/2004 | Isaksson ..................... 407/114 |
| 6,939,091 | B2 | * | 9/2005 | Wermeister ................. 407/113 |

* cited by examiner

*Primary Examiner*—Willmon Fridie, Jr.
(74) *Attorney, Agent, or Firm*—Andrew Wilford

(57) ABSTRACT

A support movable in a predetermined direction carries a cutting insert having a body formed with a front face lying generally in a plane generally parallel to the direction and an arcuate edge face having an inner end merging with the front face, an outer end and defining between the inner and outer ends an arcuate cutting edge. A side face directed forward in the direction defines an outer cutting edge extending transversely of the front face from the outer end of the arcuate cutting edge.

8 Claims, 5 Drawing Sheets

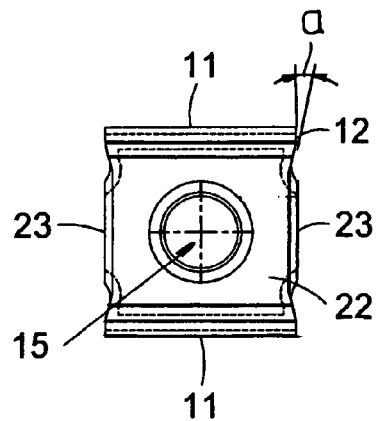
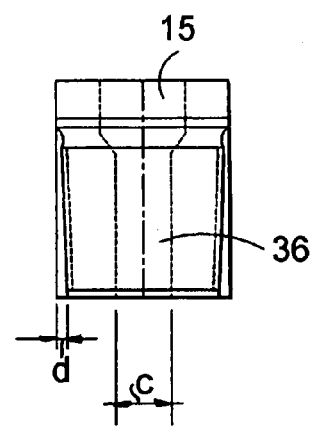
Fig. 9
Fig. 10
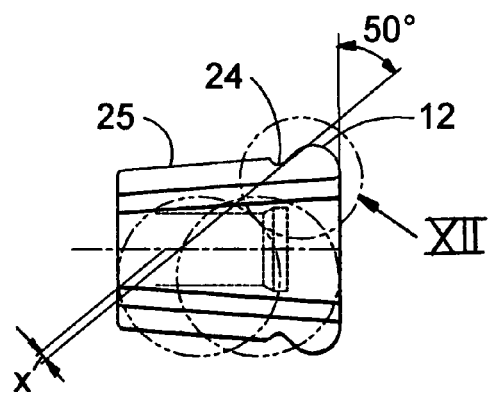
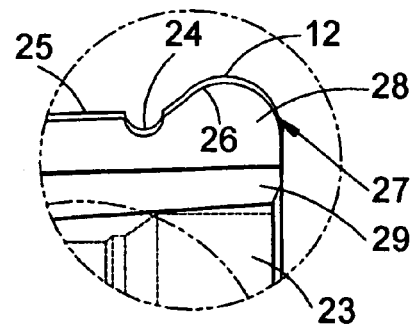
Fig. 11
Fig. 12

CUTTING INSERT

CROSS REFERENCE TO RELATED APPLICATIONS

This application is the US national phase of PCT application PCT/DE2004/001406, filed 2 Jul. 2003, published 20 Jan. 2005 as WO 2005/005084, and claiming the priority of German patent application 10331148.3 itself filed 9 Jul. 2003 and German patent application 10333621.4 itself filed 24 Jul. 2003.

FIELD OF THE INVENTION

The invention relates to a cutting insert normally clamped to a disk- or bar-shaped tool body, in particular for milling crankshafts and having a front face along one edge of which and preferably along opposite edges there is a convex edge face having an arcuate edge extending over an angle between 90° and 180° and serving as cutting edge.

The invention further relates to a milling tool with a plurality of edge-mounted cutting tools.

BACKGROUND OF THE INVENTION

The above-described cutting inserts are used for milling outside surfaces and forming undercuts on crankshafts. Such an application is described by way of example in U.S. Pat. No. 6,374,472 in a disk-shaped outside miller that is driven such that the chip-removing machining takes place at cutting speeds above 160 m/min. To this end both the crankshaft and the outside miller are rotated. To machine the cylindrical surfaces of the rotating workpiece, with a crankshaft machining its journals, tangentially attached cutting inserts are used that have according to the teachings of U.S. Pat. No. 6,374,472 generally rectangular upper faces that are defined by peripheral main cutting edges. Immediately adjacent there are four side faces that together form auxiliary cutting edges. The upper face has near each corner formed by adjacent main cutting edges a flat or recess that extends up to the two adjacent cutting edges and when the cutting insert is installed tangentially defines between the effective cutting face that is formed by the side faces and the effective free face that is formed by the upper rectangular surface an angle of 75° to 85° so that there is an effective cutting angle between −5° and +15°. In order to machine the crankshaft in any case two different cutting inserts are required, one of which is mounted radially for making the undercut and the other tangentially for finishing the journal.

Tools are also known from the prior art that are rotated in so-called single or double rotary systems. With single rotary systems a tool is moved radially to the rotating tool. With double-rotary systems a row of cutting inserts on the periphery of a disk-shaped tool support are set in steps along a first section of the disk. This tool is swung along an arc radially to the rotating workpiece as described in principal in U.S. Pat. Nos. 4,790,698 and 5,037,248 and EP 0,286,771. Even with these bar-shaped or disk-shaped tools two geometrically different types of cutting inserts are used for machining the journals and making the undercuts.

It is also known that for precisely maintaining the desired tolerances in the crankshaft or other rotating workpiece being machine to use shims when installing the cutting inserts to set the cutting width and to use hardened support pieces to prevent imbedding in the seat of the cutting insert. Cutting inserts, support pieces, and shims can be set in cassettes that are secured to the disk- or bar-shaped tool support.

The milling tool works more cost efficiently with a shallower cut, that is with the gentlest possible machining operation. This can also be achieved when the tool has the maximum possible number of effective cutting edges. Thus according to U.S. Pat. No. 6,805,520 a disk miller is provided with tangentially clamped cutting inserts at an axial inclination of 15° to 35°, preferably 20° to 30°. The furthest back cutting corners of the tangentially clamped cutting inserts lie relative to the milling direction on a straight line perpendicular to the rotation direction of the disk miller that has from the frontmost cutting edge of the following radially clamped cutting insert a spacing of $\leq 5$ mm, preferably $\leq 2$ mm, down to negative values. By the use of so-called indexable cutting plates that have several usable cutting edges, the costs for the cutting inserts can be substantially reduced; thus the above-described radially or tangentially clamped cutting inserts each have four usable cutting edges. If the usable cutting edges of the cutting inserts are all worn, the cutting inserts have to be replaced, which requires that the required cutting-insert types be stocked.

OBJECT OF THE INVENTION

It is an object of the invention to provide a cutting insert that can be used in many different applications.

SUMMARY OF THE INVENTION

This object is attained by the cutting insert according to the invention in that either a straight cutting edge generally perpendicular to the front face or at a maximum angle of 4° to a perpendicular to the front face or a concave edge merges with the arcuate cutting edge. A mounting hole for receiving a mounting screw can in a first embodiment extend through the front face; in this case the cutting insert can be mounted laterally on the tool support. According to a second embodiment a mounting hole for receiving a mounting screw extends through a roof surface so that the cutting insert can be mounted via a mounting screw extending radially of the tool support. The straight edge or the concave edge serve as chip breakers. In a further embodiment of the invention extending from the concave edge there is a straight cutting edge for machining cylindrical surfaces, in particular journals of crankshafts. Preferably a miller ha a plurality of laterally mounted cutting inserts, a cutting insert with an arcuate edge and a straight adjacent edge alternating with a cutting insert with an arcuate edge and a concave adjacent edge and a further straight edge. The straight edge of the first cutting insert and the concave edge of the second cutting insert lie in the same surface plane, so as to give the particular advantage that the number of cutting edges doing the undercutting is doubled, since the cutting insert with an additional straight cutting edge can finish cylindrical surfaces while the adjacent arcuate cutting edges undercuts.

In order to stabilize the cutting edge this cutting edge according to the invention has an edge bevel that extends at a bevel angle of 0° to 20°, preferably 10°, and/or a width of 0.1 m to 0.25 mm, preferably 0.12 mm, and/or that tapers at the front face to a width of 0 mm. Preferably the radius of curvature of the arcuate cutting edge, is 1.0 mm to 2.5 mm, in particular 1.4 mm.

When behind the arcuate cutting edge there is a concave edge, its radius of curvature is smaller than the radius of curvature of the arcuate cutting edge. In a concrete embodiment the radius of curvature of the concave edge is 0.6 mm. The concave edge acts along with the adjacent straight edge as a chip separator.

The flanks adjacent the arcuate cutting edge and/or the straight cutting edge are set according to a further embodiment of the invention at a positive cutting angle between 0° and 20°, preferably at a positive cutting angle of 10°. In order to shape the passing chip optimally, the chip face adjacent the cutting edges is formed with a ship-shaping groove, that is done by forming it with a flank with a positive dropping chip angle and another rising flank that bends up and breaks the chip.

According to a further feature of the invention, the cutting insert that has both an arcuate cutting edge for undercutting and a straight cutting edge for finishing a journal can have side faces at central regions that flank the front face that taper away from the front face and that preferably act as chip-conducting steps for chips produced by the straight cutting edge. These planar side faces form together with the further support faces support faces for the cutting-plate seat so as to eliminate the need for support pieces.

BRIEF DESCRIPTION OF THE DRAWING

Further advantages and embodiments of the cutting insert according to the invention as well as milling tools equipped with the cutting inserts are described in the following with reference to the drawings. Therein:

FIGS. 9 to 11 are different views of the cutting insert of FIG. 3;

FIG. 12 is a detail view from FIG. 11;

SPECIFIC DESCRIPTION

Figure 1:
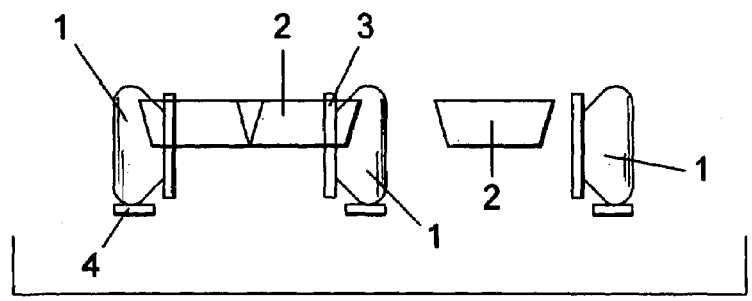
FIG. 1 is schematic views of known prior-art cutting inserts for radial or tangential mounting and the cut shape produced by a plurality of such cutting inserts.
Figure 2:
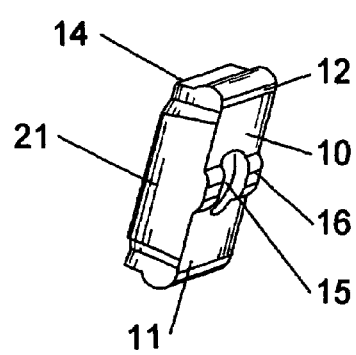
FIG. 2 is a perspective view of a first embodiment of a cutting insert according to the invention.

The cutting insert 1 according to FIG. 1 is the starting point for the instant invention. This cutting insert has a front face from which extend convex edge surfaces that extend between opposite parallel surfaces and whose arcuate shapes form cutting edges. This cutting insert is fixed to the side of and alternates with a tangentially clamped cutting insert 2 on a tool holder, for example a milling disk. In order to hold them in precise position for high-tolerance machining of a crankshaft, shims 3 are used and hardened support bodies 4 are provided to prevent them from imbedding in the seats of the indexable cutting inserts. The produced cut line or contour is shown on the left side of FIG. 1.

Figure 5:
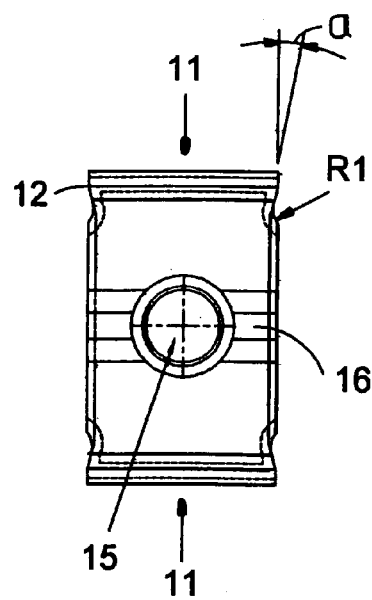
FIGS. 5 to 7 are different views of the cutting insert of FIG. 2.
Figure 6:
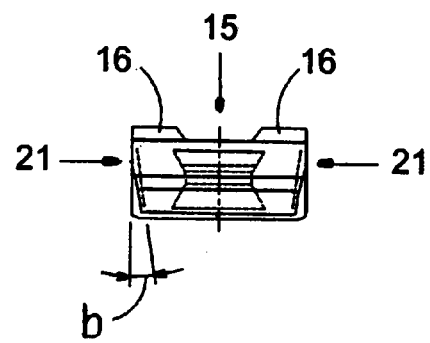
Figure 7:
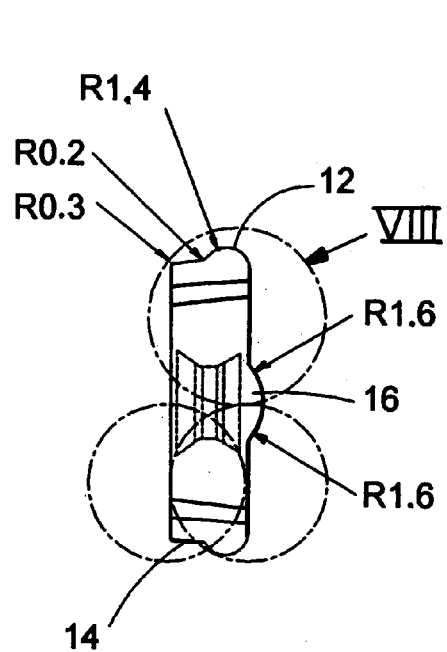
Figure 8:
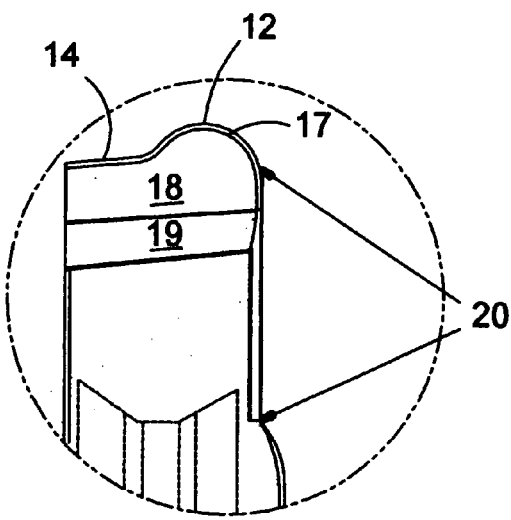
FIG. 8 is an enlarged detail view from FIG. 7.

In a first embodiment of the present invention as shown in FIG. 2 and FIGS. 5 to 8 the cutting insert has a front face that merges at each end with a convex edge face 11 whose lateral edges serve as cutting edges. These cutting edges are not extended at an angle as in the cutting insert of FIG. 1, but are extended instead in a straight line generally perpendicular to the support face or at a maximum angle of 4° to the support face to edges 14 over a full-width extension of the cutting insert. A mounting hole 15 in the front face extends all the way through the cutting insert (see FIG. 6). To both sides of the mounting hole and parallel to the upper and lower edges formed by the face 11 there is a raised portion 16 whose edge is useful for making a sleeve rim. Further details of this cutting insert are seen in FIGS. 5 to 8. The cutting insert is mirror symmetrical both along a longitudinal and a transverse axis so that there are four cutting edges 12 flanking the end faces 11. The radius of curvature of the cutting edges 12 is 1.0 mm to 2.5 mm, preferably 1.4 mm. Extending from them at an angle between 0° and 10°, preferably between 3° and 4° relative to a perpendicular from the front face 12 there is the edge 14 which extends over the entire width at the rear of the cutting insert. As shown in FIG. 5, the cutting edges 12 are set at an angle a of 0° to 20°, preferably 10° to the longitudinal center axis of the cutting insert or a line parallel thereto. The cutting edges 12 and the edge 14 are provided with a bevel 17 that extends at a bevel angle of 0° to 25°, preferably 10° and that has a uniform bevel width of 0.1 to 0.25 mm, e.g. 0.12 mm. Behind the cutting edge 12 and the edge 14 there is a chip-shaping region that is comprised of a falling flank 18 forming a positive chip angle and a rising flank 19 to shape and break the chip. The bevel 17 like the bevel on the cutting edge of the raised portion 16 tapers away at the ends at the arcuate cutting edge to 0 (see reference 20). In the center the cutting insert forms small planar flank faces 21 that serve as mounting surfaces. FIG. 6 also shows that the cutting insert, except at the flank faces 21, is angled back at an angle b of 0° to 10° in the region of the flanks 18 and 19 forming the chip faces.

Figure 3:
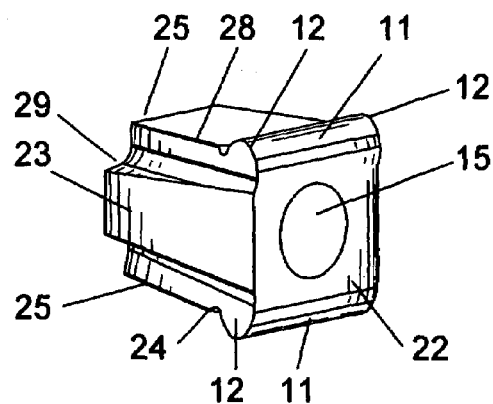
FIG. 3 is a perspective view of a second embodiment of the invention.
Figure 13:
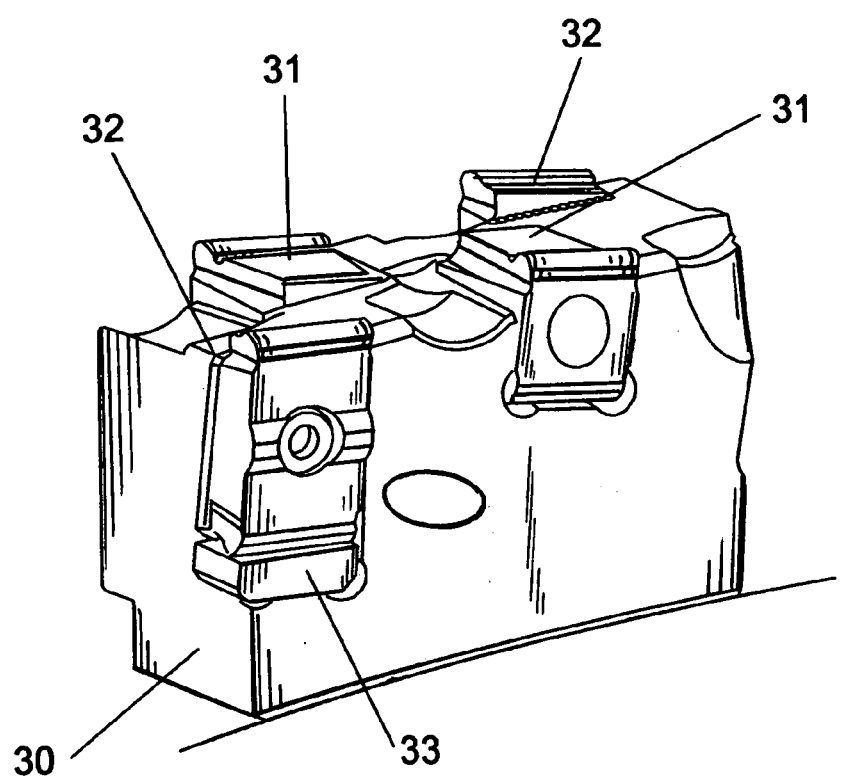
FIG. 13 is a partial view of a miller fitted with cutting inserts according to FIGS. 1 to 12.

A further embodiment of the invention is shown in FIG. 3 and FIGS. 9 to 12. This cutting insert has a planar front face 22 from whose central region a pair of side faces 23 extend backward, each tapering rearward. These side faces 23 serve as support faces for mounting. Arcuate end faces 11 are defined by cutting edges 12 whose radius of 1.0 mm to 2.5 mm, preferably 1.4 mm, is the same as the cutting-edge radius of the cutting edge of the cutting insert of FIG. 2. These cutting edges 12 merge with a concave edge portion 24 that is effective in the FIG. 3 embodiment as a chip separator and that extends as a circular groove over the entire width of the cutting insert. The radius of this concave edge 24 is substantially smaller than the radius of the cutting edge 12. Extending back to the rear end of the cutting insert from each of these concave edges 24 is a straight cutting-edge portion 25. This straight cutting edge 25 serves for finishing cylindrical surfaces, in particular journal surfaces of crankshafts as will be described below. Along the edges 12, 24, and 25 there is a bevel 26 that lies at an angle of 0° to 20°, preferably 10°, and that has a width from 0.1 to 0.25 mm, preferably 0.12 mm. This bevel 26 tapers at the front face at 27 to zero. Extending from the cutting edges 12, 24, and 25 or the bevel 26 there is a falling face 28 at a positive chip angle that merges at its rear end with a rising face 29 so that the faces 28 and 29 form a chip-shaping groove. The mounting hole or the throughgoing aperture 15, 36 has in the upper part 15 a recess for holding a head of a mounting screw, the hole lower part 36 having a width c that allows a shaft of the mounting screw to pass. As visible in FIGS. 3 and 10, the edges 12, 24, and 25 extend rearwardly at an angle d that is $\leq 3°$. The cutting insert of FIG. 3 and FIGS. 9 to 12 is also set laterally on a tool holder, e.g. an outside miller, as shown partially in FIG. 13 at a tool body 30. The concave edge serves in this system as a chip breaker that serves to separate the chip formed by the straight cutting-edge portions 25 and the convex cutting edge 12. As shown in FIG. 13 the disk-shaped tool support 30 carries cutting inserts 31 according to FIG. 3 alternating with cutting inserts 32 according to FIG. 2. The cutting inserts 31 and 32 are positioned along one edge such that the edges 14 of the cutting inserts 32 and the concave edge portions 24 of the cutting inserts 31 overlap. As a result the cutting operation of the machine on which the support 30 is mounted is improved with respect to separation of chips and reduced cutting force per cutting insert. Unlike the cutting insert 32 that is braced by a support block 33, the cutting insert 31 needs no support piece since there are sufficiently large support surfaces for the cutting insert seat (on all four sides). The cutting insert 31 replaces the prior-art tangentially mounted cutting inserts that are of square shape seen from above, with the advantage that it has an additional cutter for making the undercut so that in use the cutting inserts 31 and 32 have twice as many cutting edges for making undercuts. The alternating mounting of the cutting inserts 31 and 32 on a miller is only chosen to save space, since the cutting inserts of FIG. 3 are relatively bulky and cannot be mounted immediately adjacent one another as they can when the cutting inserts 31 and 32 alternate. In addition the cutting insert 31 needs no support body and no shimming so that these parts can be eliminated. The cutting insert 31 has four cutting edges 12 and four cutting edge portions 25 that can be used by appropriate indexing of the cutting insert. The tool support 30 is formed as an outside miller; but the cutting insert 31 and the cutting insert 32 can also serve as an inside miller or be used on a bar-shaped tool for single- or double-rotary milling.

Figure 4:
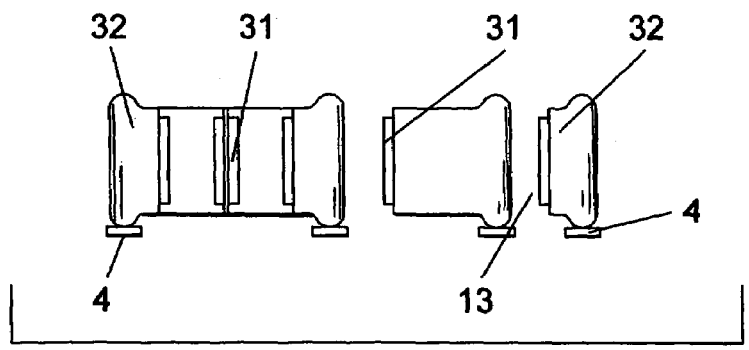
FIG. 4 is schematic views of the cutting inserts of FIGS. 2 and 3 and the cutting shapes they produce.

The profile produced by the cutting inserts 31 and 32 is shown FIG. 4 on the left. The cutting insert 32 is positioned by a shim 13.

Figure 14:
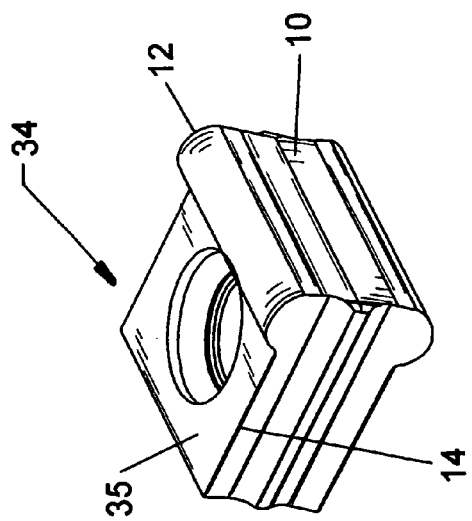
FIG. 14 is perspective view of another embodiment of a cutting insert according to the invention.

The embodiment of FIG. 14 is a cutting insert whose mounting hole extends through a surface 35 that terminates at the edge 14 as a top face. The cutting insert is mirror symmetrical to a center plane parallel to this face 34 and thus can be used as an indexable cutting insert.

Figure 15:
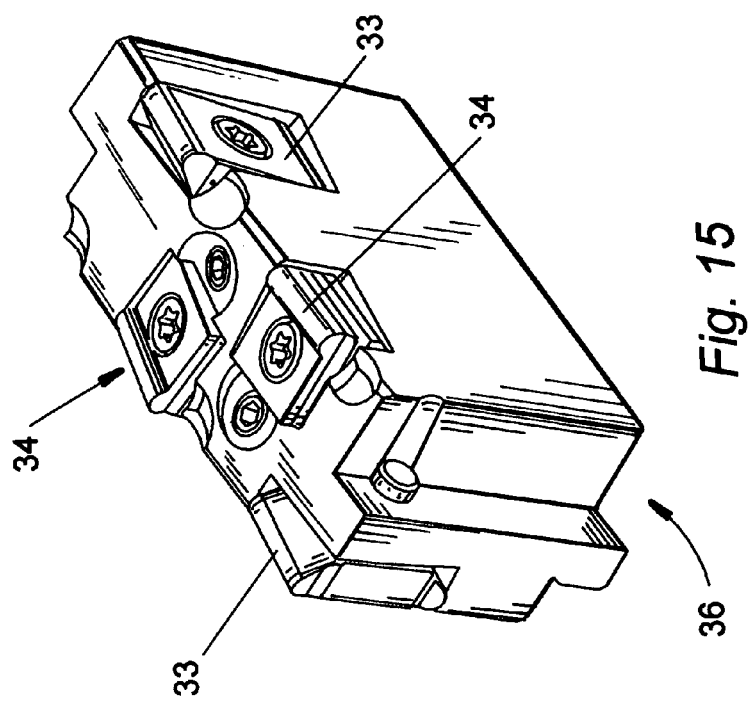
FIG. 15 is a partial view of a miller that is provided with cutting inserts according to FIG. 14.

FIG. 15 shows a miller 36 having cutting inserts 33 and 34. This has the advantages of the miller of FIG. 13.

The invention claimed is:

1. In combination with a support movable in a predetermined direction, a cutting insert having a body secured to the support and formed with:
   a front face lying generally in a plane generally parallel to the direction;
   an arcuate edge face having an inner end merging with the front face, an outer end, and defining between the inner and outer ends an arcuate cutting edge;
   a side face directed forward in the direction and defining an outer cutting edge extending transversely of the front face from the outer end of the arcuate cutting edge, the outer cutting edge having a concave portion merging at the outer end with the arcuate cutting edge and a straight outer portion extending outward away from the concave portion;
   a planar side face extending transversely inward away from the front face along the outer cutting edge; and
   a flank extending between the planar side face and the straight outer portion of the outer cutting edge and acting as a chip-conducting step for chips produced by the straight outer portion.

2. The cutting insert according to claim 1 wherein a mounting hole for receiving a mounting screw extends through the front face so that the cutting insert can be mounted laterally on the tool support.

3. The cutting insert according to claim 1 wherein a mounting hole for receiving a mounting screw extends through a roof surface so that the cutting insert can be mounted via a mounting screw extending radially of the tool support.

4. The cutting insert according to claim 1 wherein the arcuate cutting edge has an edge bevel that extends at a bevel angle of 0° to 20° and/or that tapers at the front face to a width of 0 mm.

5. The cutting insert according to claim 1 wherein the radius of curvature of the arcuate cutting edge is 1.0 mm to 2.5 mm.

6. The cutting insert according to claim 1 wherein the radius of curvature of the concave edge is smaller than the radius of curvature of the arcuate cutting edge, preferably 0.3 mm to 1 mm.

7. The cutting insert according to claim 1 wherein flanks adjacent the arcuate cutting edge and/or the straight cutting edge are set at a positive cutting angle between 0° and 20°.

8. A milling tool with a plurality of laterally clamped cutting inserts according to claim 1, where a cutting insert with an arcuate edge and a straight adjacent edge alternates with a cutting insert with an arcuate edge and a concave adjacent edge and a further straight edge.

* * * * *